(12) United States Patent
Lee (10) Patent No.: US 8,972,058 B2
(45) Date of Patent: Mar. 3, 2015

(54) WEARABLE ROBOT AND CONTROL METHOD THEREOF

(71) Applicant: Foundation of Soongsil University-Industry Cooperation, Seoul (KR)

(72) Inventor: Donghun Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 107 days.

(21) Appl. No.: 13/788,331

(22) Filed: Mar. 7, 2013

(65) Prior Publication Data

US 2014/0188275 A1    Jul. 3, 2014

(30) Foreign Application Priority Data

Jan. 3, 2013  (KR) .................. 10-2013-0000605

(51) Int. Cl.
| | |
|---|---|
| *A61H 1/02* | (2006.01) |
| *B25J 5/00* | (2006.01) |
| *B25J 9/00* | (2006.01) |
| *B25J 9/16* | (2006.01) |

(52) U.S. Cl.
CPC ............... *B25J 5/007* (2013.01); *B25J 9/0006* (2013.01); *B25J 9/162* (2013.01); *Y10S 901/08* (2013.01)

USPC .................................... 700/257; 601/5; 901/8

(58) Field of Classification Search
CPC ........... B25J 19/0008; B25J 13/08; B25J 5/00
USPC ...................... 700/257; 601/5, 23–26, 33–35; 318/568.12, 568.16, 568.18, 590, 591
See application file for complete search history.

(56) References Cited

U.S. PATENT DOCUMENTS

| | | | |
|---|---|---|---|
| 6,155,993 A * | 12/2000 | Scott ............................. 600/595 |
| 2006/0276728 A1* | 12/2006 | Ashihara et al. .................. 601/5 |
| 2011/0295165 A1* | 12/2011 | Cavallaro et al. ............... 601/33 |

* cited by examiner

*Primary Examiner* — Dalena Tran
(74) *Attorney, Agent, or Firm* — Sherr & Jiang, PLLC (57) ABSTRACT

Disclosed herein is a wearable robot with improved operability and mobility through improvement of the upper limb structure thereof. The wearable robot includes an upper limb muscular power assist device to perform an articulation motion with a predetermined degree of freedom, the upper limb muscular power assist device being wearable by a user, and a mobile platform connected to the upper limb muscular power assist device to move according to information regarding movement speed and movement direction of the user in a rolling fashion. Consequently, mobility of the wearable robot and operation efficiency of the user are improved.

18 Claims, 8 Drawing Sheets

WEARABLE ROBOT AND CONTROL METHOD THEREOF

CROSS-REFERENCE TO RELATED APPLICATION(S)

This application claims the benefit of Korean Patent Application No. 2013-0000605, filed on Jan. 3, 2013 in the Korean Intellectual Property Office, the disclosure of which is incorporated herein by reference.

BACKGROUND

1. Field

Embodiments of the present invention relate to a wearable robot that assists muscular power of a user and a control method thereof.

2. Description of the Related Art

Generally, a robot is widely used in various industries. The robot performs dangerous tasks, such as die casting, forging, and spot welding. In recent years, there has been a necessity for a multi-purpose remotely controlled robot having a high degree of freedom sufficient to perform various tasks in place of a human in addition to such an industrial robot, and continuous research has been conducted into such a robot as a substitute for humans.

As a control device to efficiently remotely control such an industrial robot or a humanoid robot manipulator, a master device having the same shape as a slave robot, which is controlled, is used, or a humanoid master device that is directly attached to an arm of a human is used. The humanoid master device has an advantage in that natural human motion is used as pressure of the master device. For this reason, much research has been conducted into the humanoid master device. In recent years, a wearable robot which is put on a human to assist muscular power of the human has been developed.

The wearable robot is a wearable type robot based on synchronization between a human and the robot. The wearable robot is used as a rehabilitation device for muscle disease patients, a muscular power assist device for patients with muscle weakness, a muscular power amplifier for soldiers in heavy uniform, etc. However, the conventional wearable robot is divided into an upper limb and a lower limb, which complicates the overall system and limits motion of an operator.

SUMMARY

It is an aspect of the present invention to provide a wearable robot with improved operability and mobility through improvement of the upper limb structure thereof and a control method thereof.

Additional aspects of the invention will be set forth in part in the description which follows and, in part, will be obvious from the description, or may be learned by practice of the invention.

In accordance with one aspect of the present invention, a wearable robot includes an upper limb muscular power assist device to perform an articulation motion with a predetermined degree of freedom, the upper limb muscular power assist device being wearable by a user, and a mobile platform connected to the upper limb muscular power assist device to move according to information regarding movement speed and movement direction of the user in a rolling fashion.

A movement type of the mobile platform may be controlled according to a movement mode of the mobile platform, and the movement mode may include a real time movement mode and a following mode.

In a case in which the movement mode is the real time movement mode, the mobile platform may move according to the information regarding the movement speed and the movement direction of the user such that the mobile platform keeps pace with the user.

In a case in which the movement mode is the following mode, the mobile platform may receive the information regarding the movement speed and the movement direction of the user and follow the user after the lapse of a predetermined standby time.

The movement mode of the mobile platform may be automatically set to the real time movement mode when the user wears the upper limb muscular power assist device.

The movement mode of the mobile platform may be automatically set to the following mode when the user does not wear the upper limb muscular power assist device.

The wearable robot may further include an input unit to perform interfacing with the user, wherein the real time movement mode or the following mode may be selected according to manual manipulation through the input unit.

The mobile platform may receive the information regarding the movement speed and the movement direction of the user through a movement sensor attached to the user and move according to the received information.

The mobile platform may include driving wheels to adjust movement speed of the wearable robot and front wheels to adjust movement direction of the wearable robot.

In accordance with another aspect of the present invention, a control method of a wearable robot, including an upper limb muscular power assist device to perform an articulation motion with a predetermined degree of freedom, the upper limb muscular power assist device being wearable by a user, and a mobile platform connected to the upper limb muscular power assist device to move according to information regarding movement speed and movement direction of the user in a rolling fashion, includes receiving information regarding movement direction and movement speed of the user through a movement sensor attached to the body of the user during movement of the user and controlling the mobile platform to move such that the mobile platform keeps pace with the user or to follow the user according to the information regarding the movement direction and the movement speed of the user.

The step of controlling the mobile platform to move such that the mobile platform keeps pace with the user or follow the user according to the information regarding the movement direction and the movement speed of the user may include controlling the mobile platform to move in real time according to the information regarding the movement direction and the movement speed of the user such that the mobile platform keeps pace with the user in a case in which a movement mode of the wearable robot is a real time movement mode.

The step of controlling the mobile platform to move such that the mobile platform keeps pace with the user or follow the user according to the information regarding the movement direction and the movement speed of the user may include receiving the information regarding the movement direction and the movement speed of the user and controlling the mobile platform to follow the user after the lapse of a predetermined standby time in a case in which the movement mode of the wearable robot is a following mode.

The mobile platform may be controlled to move in the real time movement mode such that the mobile platform keeps pace with the user when the user moves while wearing the upper limb muscular power assist device.

The mobile platform may be controlled to move in the following mode such that the mobile platform follows the user after the lapse of a standby time when the user moves while not wearing the upper limb muscular power assist device.

In accordance with a further aspect of the present invention, a wearable robot includes a communication unit to receive information regarding movement direction and movement speed of a user during movement of the user and a controller to control the wearable robot to move such that the wearable robot keeps pace with the user or to follow the user according to a movement mode upon receiving the information regarding the movement direction and the movement speed of the user.

The movement mode may include a real time movement mode and a following mode, and the controller may control the wearable robot to move such that the wearable robot keeps pace with the user in a case in which the movement mode of the wearable robot is the real time movement mode and control the wearable robot to follow the user in a case in which the movement mode of the wearable robot is the following mode.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
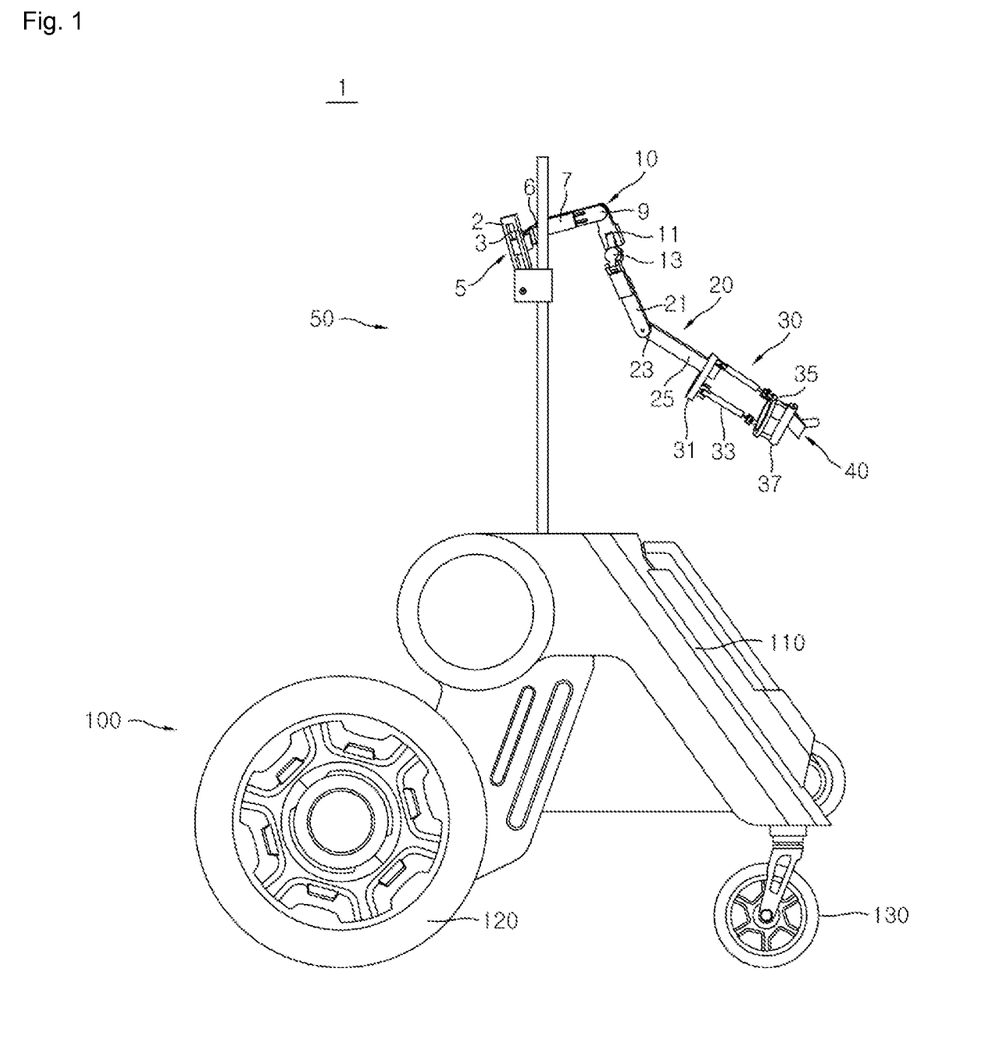
FIG. 1 is a view schematically showing the external appearance of a wearable robot according to an embodiment of the present invention.

FIG. 1 is a view schematically showing the external appearance of a wearable robot 1 according to an embodiment of the present invention.

The wearable robot 1 may include an upper limb muscular power assist device 50 and a mobile platform 100.

The upper limb muscular power assist device 50 may include a mobile platform connection unit 5, a shoulder series type mechanism 10, an elbow series type mechanism 20, a wrist parallel type mechanism 30, and a tool coupling unit 40.

The mobile platform connection unit 5 may connect the upper limb muscular power assist device 50 to the mobile platform 100.

The shoulder series type mechanism 10 may perform an articulation motion having a predetermined degree of freedom. The shoulder series type mechanism 10 may include a ring unit 2 connected to the mobile platform connection unit 5, a back articulation unit 3 connected to the ring unit 2, a back muscle link unit 6 connected to the back articulation unit 3, and a shoulder muscle link unit 7 connected to the back muscle link unit 6. Also, the shoulder series type mechanism 10 may further include a shoulder front and rear articulation unit 9 connected to the shoulder muscle link unit 7, a shoulder link unit 11 connected to the shoulder front and rear articulation unit 9 such that the shoulder link unit 11 is rotated forward or backward by a predetermined angle according to motion of the shoulder front and rear articulation unit 9, and a shoulder left and right articulation unit 13 connected to the shoulder link unit 11.

The link units, i.e. the back muscle link unit 6 and the shoulder muscle link unit 7, of the shoulder series type mechanism 10 each may include a variable length unit having a variable length function for adaptation to the physical size of a wearer. As a result, the wearer may adjust the variable length units respectively provided at the back muscle link unit 6 and the shoulder muscle link unit 7 such that the length of the shoulder series type mechanism 10 corresponds to the widths of the shoulder and back of the wearer. The variable length units respectively provided at the back muscle link unit 6 and the shoulder muscle link unit 7 may be configured to be manually operated or automatically operated by a power-driven member, such as a motor or a gear.

The elbow series type mechanism 20 may include an upper arm link unit 21 connected to the shoulder left and right articulation unit 13, an elbow articulation unit 23 connected to the upper arm link unit 21, a lower arm link unit 25 connected to the elbow articulation unit 23. The upper arm link unit 21 may be connected to the shoulder left and right articulation unit 13 to provide a degree of freedom to move left and right on the basis of the shoulder link unit 11. The elbow articulation unit 23 may be connected to the upper arm link unit 21 and provide a degree of freedom for the lower arm link unit 25 to move in a predetermined direction, for example upward and downward, while supporting the lower arm link unit 25. The wearer may control the lower arm link unit 25 and the wrist parallel type mechanism 30 connected to the lower arm link unit 25 to move upward and downward on the basis of the elbow articulation unit 23. The lower arm link unit 25 may be connected to the wrist parallel type mechanism 30. The lower arm link unit 25 may be disposed such that the length of the lower arm link unit 25 is changed to a predetermined level.

The wrist parallel type mechanism 30 may include a lower arm support unit 31 connected to the lower arm link unit 25, a parallel type link unit 33 connected to the lower arm support unit 31, a wrist rotation unit 35 to fix the parallel type link unit 33, and a grip unit 37 connected to the wrist rotation unit 35. In the wrist parallel type mechanism 30, the parallel type link unit 33 connected to the lower arm support unit 31, which is formed in the shape of a ring, through which an arm of the wearer extends, may be connected to the wrist rotation unit 35 such that the parallel type link unit 33 is rotated by a predetermined angle according to a hand motion of the wearer.

The tool coupling unit 40 may be connected to one side of the wrist rotation unit 35. Various tools may be coupled to the tool coupling unit 40 according to purposes of the wearable robot 1.

As previously described, the upper limb muscular power assist device 50 may include the parallel type mechanism, which provides three degrees of freedom to the shoulder and the wrist based on the back articulation unit 3 and the shoulder front and rear articulation unit 9, to guide various rotations of the wrist.

The mobile platform 100 may include a base frame 110, driving wheels 120, and front wheels 130.

The base frame 110 may form a lower frame of the wearable robot 1. The front of the base frame 110 may be formed in the shape of a plate. The rear of the base frame 110 may be divided into left and right parts, between user walk may be allowed.

A pair of driving wheels 120 may be provided. Consequently, the driving wheels 120 may be fastened to opposite sides of the base frame 110, respectively. The driving wheels 120 may perform a rolling motion in a state in which the driving wheels 120 are in contact with a floor to provide forward and backward driving force to the mobile platform 100. Each driving wheel 120 may be configured to have a wheel integration type structure in which a driving motor (not shown) is mounted therein. The driving wheels 120 may receive a signal from a movement sensor attached to the body of a user such that forward and backward driving force of the driving wheels 120 is adjusted according to movement velocity of the user.

The front wheels 130 may be rotated in a predetermined direction on the basis of a vertical axis thereof to guide movement direction of the mobile platform 100. A pair of front wheels 130 may be provided. Consequently, the front wheels 130 may be fastened to opposite sides of the front of the base frame 110, respectively. The front wheels 130 may receive a signal from the movement sensor attached to the body of the user such that the direction of the front wheels 130 is adjusted according to movement direction of the user.

Figure 2:
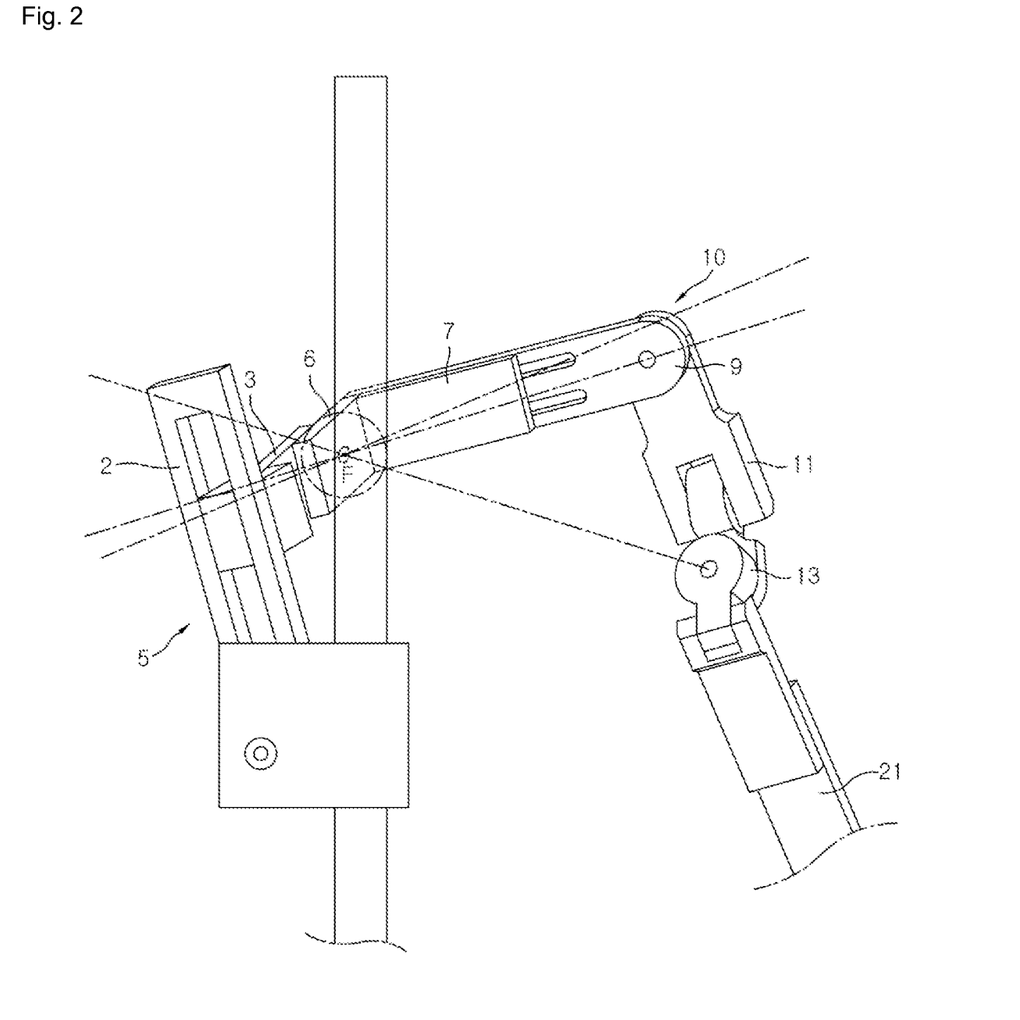
FIG. 2 is a view illustrating a degree of freedom of an upper limb muscular power assist device of the wearable robot according to the embodiment of the present invention.

FIG. 2 is a view illustrating a degree of freedom of the upper limb muscular power assist device 50 of the wearable robot according to the embodiment of the present invention.

In the shoulder series type mechanism 10, the back articulation unit 3 is disposed between the ring unit 2 connected to the mobile platform connection unit 5 and the back muscle link unit 6, the shoulder front and rear articulation unit 9 is disposed between the shoulder muscle link unit 7 and the shoulder link unit 11, and the shoulder left and right articulation unit 13 is disposed at one end of the shoulder muscle link unit 7. The back articulation unit 3 supports the back muscle link unit 6 such that the back muscle link unit 6 moves forward and backward. The shoulder front and rear articulation unit 9 supports the shoulder link unit 11 such that the shoulder link unit 11 moves forward and backward. The shoulder left and right articulation unit 13 supports the upper arm link unit 21 such that the upper arm link unit 21 moves left and right. As shown, the back articulation unit 3, the shoulder front and rear articulation unit 9, and the shoulder left and right articulation unit 13 may provide a shoulder articulation point F at which three rotational axes join, to support three degree-of-freedom motion on the basis of the shoulder articulation point F. Motion in each direction may be applied through a combination of passive or active articulations according to needs for support. The back articulation unit 3, the shoulder front and rear articulation unit 9, and the shoulder left and right articulation unit 13 each may be configured to have a passive or active articulation type structure according to the intention of a designer or purposes of using the upper limb muscular power assist device 50. Also, the three degrees of freedom may be supported through application of various rotation driving methods using an electric motor or a hydraulic motor.

Figure 3:
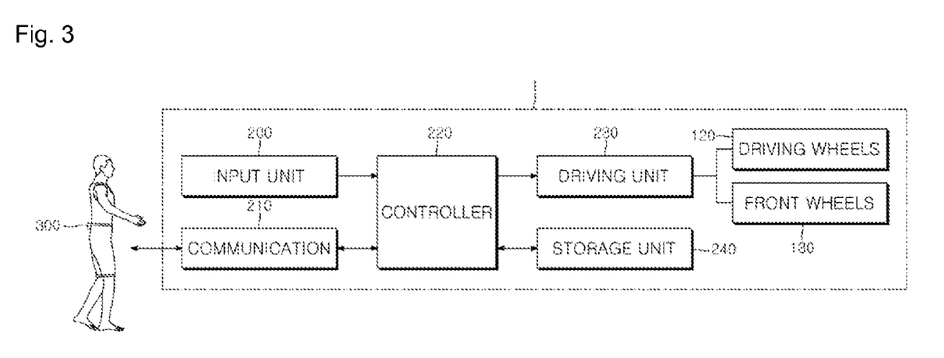
FIG. 3 is a control block diagram of the wearable robot according to the embodiment of the present invention.

FIG. 3 is a control block diagram of the wearable robot according to the embodiment of the present invention.

The wearable robot 1 may include an input unit 200, a communication unit 210, a controller 220, a driving unit 230, and a storage unit 240.

The input unit 200 may be provided with an interface, through which a user may adjust the wearable robot 1. The input unit 200 may be provided with a mode selection button (not shown) to allow the user to select a movement mode of the wearable robot 1. The mode selection button may be provided to select an automatic mode, in which a real time movement mode or a following mode is automatically selected, and a manual mode, in which the user manually selects the real time movement mode or the following mode. The automatic mode is a mode in which the real time movement mode is automatically set when the user performs an operation through the upper limb muscular power assist device 50, and the following mode is automatically set when the user does not manipulate the upper limb muscular power assist device 50. The manual mode is a mode in which the user manually selects the real time movement mode or the following mode.

The communication unit 210 may receive a user's motion signal from a movement sensor 300 attached to the body of a user. The movement sensor 300 attached to the body of the user may include a force/torque sensor, an inertial movement unit (IMU), or an acceleration sensor. For example, in a case in which the movement sensor 300 is an acceleration sensor, the movement sensor 300 may sense acceleration of a moving object. Acceleration is the rate of change of a velocity vector as a function of time. The velocity vector includes information regarding movement speed and movement direction. The movement sensor 300 may be attached to the waist of the user to recognize movement information, such as movement speed and movement direction, of the user. The movement sensor 300 may include a wireless transmission and receiving unit (not shown) to transmit the recognized movement information to the communication unit 210.

The communication unit 210 may receive the movement information of the user from the movement sensor 300 attached to the body of the user.

The controller 220 may control movement type of the wearable robot 1 according to the movement information of the user and the movement mode of the wearable robot 1. The movement information of the user may include information regarding movement speed and movement direction of the user (i.e. information regarding movement velocity of the user), and the movement mode of the wearable robot 1 may include a real time movement mode and a following mode.

In the real time movement mode, the controller 220 controls the wearable robot 1 to move in real time according to the movement information of the user. That is, during movement of the user, the controller 220 controls the wearable robot 1 to move in the same direction as the movement direction of the user and at the same speed as the movement speed of the user without a standby time. No standby time means that there is no other delay time except time for the controller 220 to drive the driving wheels 120 and the front wheels 130 through the driving unit 230 after receiving movement information of the user. In the real time movement mode, therefore, the controller 220 controls the wearable robot 1 to move without a standby time such that the wearable robot 1 keeps pace with the user.

In the following mode, on the other hand, the controller 220 controls the wearable robot 1 to move according to the movement information of the user after the lapse of predetermined time. That is, the controller 220 controls the wearable robot 1 to follow the user after the lapse of a predetermined standby time during movement of the user.

The driving unit 230 may drive the front wheels 130 and the driving wheels 120 of the mobile platform 110. The driving unit 230 may adjust the direction of the front wheels 130 to control the movement direction of the wearable robot 1. The driving unit 230 may adjust the rotational speed of the driving wheels 120 to control the movement speed of the wearable robot 1.

The storage unit 240 may store a program to operate the wearable robot 1. The storage unit 240 may store an operation program based on the real time movement mode or the following mode. The storage unit 240 may store an initial position of the wearable robot 1 before movement.

Figure 4A:
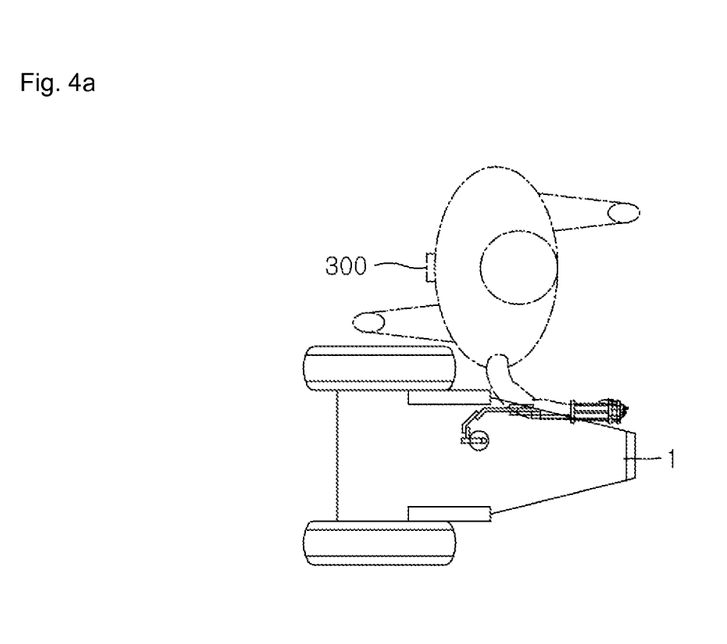
FIGS. 4A and 4B are views illustrating movement of the wearable robot according to the embodiment of the present invention in a real time movement mode.
Figure 4B:
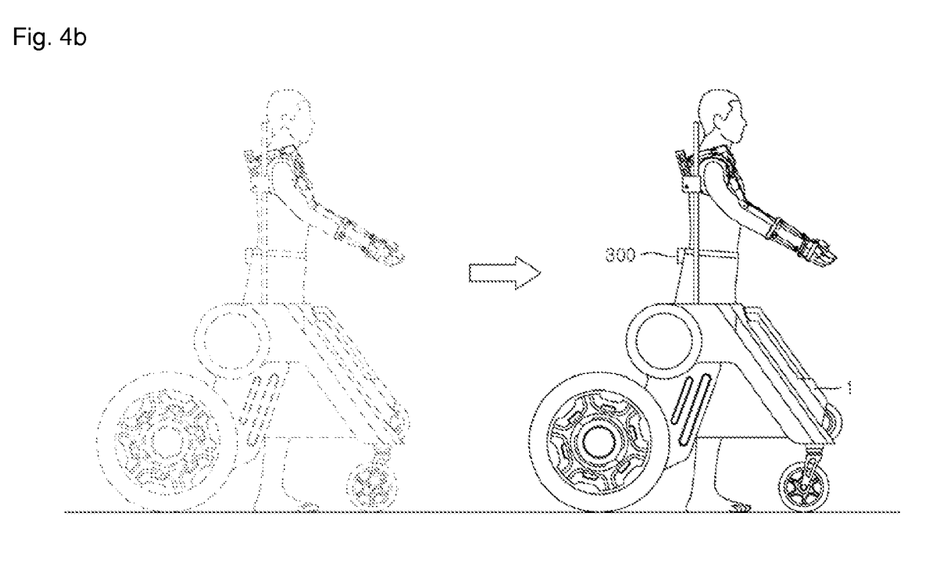

FIGS. 4A and 4B are views illustrating movement of the wearable robot according to the embodiment of the present invention in the real time movement mode.

The real time movement mode is a mode in which the user performs an operation through the upper limb muscular power assist device 50 in real time. The real time movement mode may be input through the input unit 200. Alternatively, the real time movement mode may be automatically recognized when the user manipulates the upper limb muscular power assist device 50.

In the real time movement mode, the wearable robot 1 receives movement information, such as movement direction and movement speed, of the user from the movement sensor 300 attached to the body of the user during movement of the user and immediately moves without a standby time according to the movement information of the user such that the wearable robot 1 keeps pace with the user.

Even when the user performs an operation while moving, therefore, the wearable robot 1 keeps pace with the user. Consequently, the user keeps performing the operation without delay.

Figure 5A:
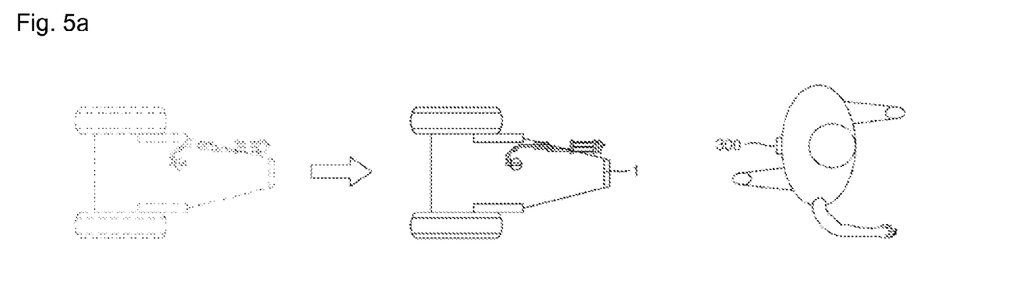
FIGS. 5A and 5B are views illustrating movement of the wearable robot according to the embodiment of the present invention in a following mode.
Figure 5B:
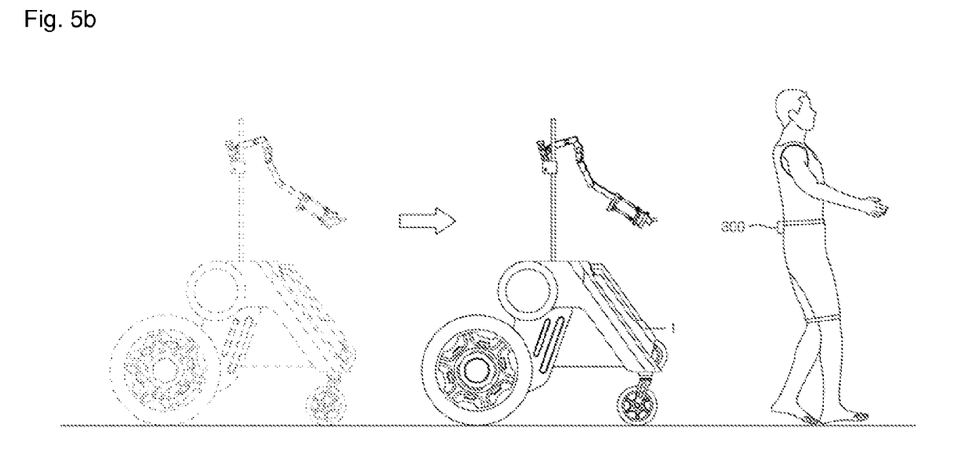

FIGS. 5A and 5B are views illustrating movement of the wearable robot according to the embodiment of the present invention in the following mode.

The following mode is a mode applied to a case in which the user moves to another position while not performing an operation in real time. The following mode may be input through the input unit 200. Alternatively, the following mode may be automatically recognized when the user moves while not manipulating the upper limb muscular power assist device 50.

In the following mode, the wearable robot 1 receives movement information, such as movement direction and movement speed, of the user from the movement sensor 300 attached to the body of the user during movement of the user and follows the user according to the movement information of the user after the lapse of a predetermined standby time.

As a result, the user may easily move the wearable robot 1 without wearing the wearable robot 1 and, when performing an operation afterward, the user may manipulate the wearable robot 1 following the user.

Figure 6:
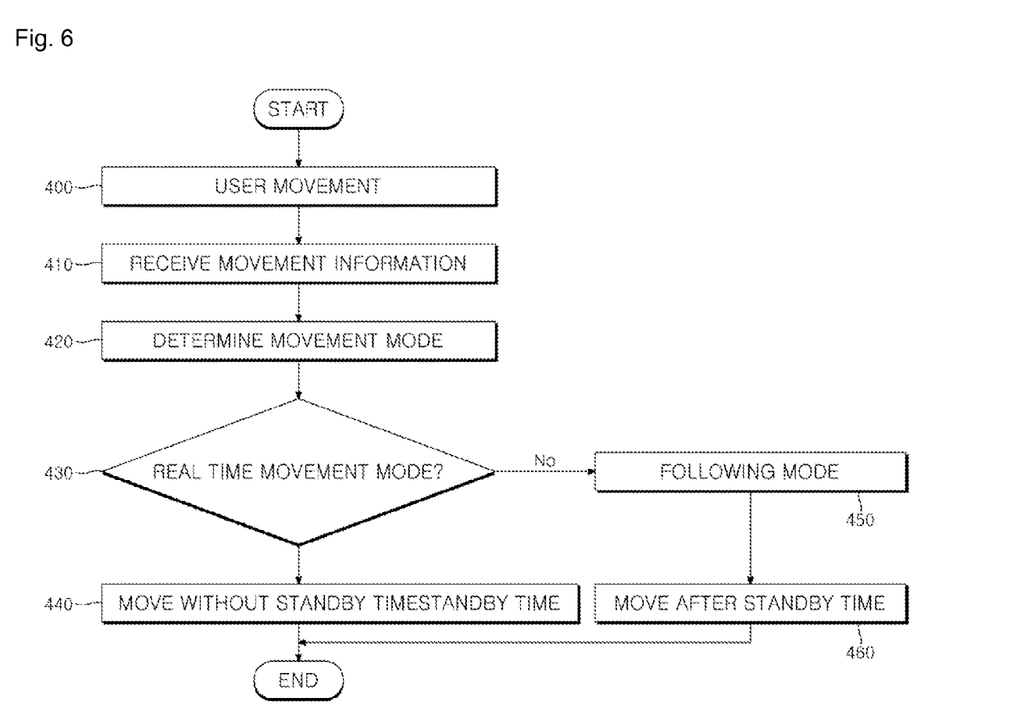
FIG. 6 is a control flowchart of the wearable robot according to the embodiment of the present invention.

FIG. 6 is a control flowchart of the wearable robot according to the embodiment of the present invention.

The communication unit 210 receives movement information, such as movement direction and movement speed, of the user from the movement sensor 300 attached to the body of the user during movement of the user (400 and 410).

Upon receiving the movement information, the controller 220 determines a control mode. The control mode may include a real time movement mode or a following mode (420).

In a case in which the control mode is the real time movement mode, the controller 220 controls the wearable robot 1 to move in the same direction as the movement direction of the user and at the same speed as the movement speed of the user without a standby time. As the wearable robot 1 moves without a standby time, the wearable robot 1 keeps pace with the user (430 and 440).

In a case in which the control mode is the following mode, on the other hand, the controller 220 controls the wearable robot 1 to follow the user according to the movement information of the user after the lapse of a standby time (450 and 460).

As is apparent from the above description, the upper limb muscular power assist device and the mobile platform are coupled to each other according to an aspect of the present invention, thereby improving mobility of the wearable robot and operation efficiency of the user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wearable robot comprising:
an upper limb muscular power assist device configured to perform an articulation motion with a predetermined degree of freedom, the upper limb muscular power assist device being operated by an electronic motor and wearable by a user;
a sensor configured to receive movement information, the sensor information comprising movement direction and speed of the user;
a controller configured to determine a movement mode based on status of the upper limb muscular power assist device being worn or not being worn, the movement mode comprising a real time mode and a following mode and the movement mode which being further selected by an input unit; and
a mobile platform connected to the upper limb muscular power assist device is caused, by the controller, to differently move the wearable robot, according to the determined movement mode and the movement information detected by the sensor regarding movement speed and movement direction of the user.

2. The wearable robot according to claim 1, wherein, in response to detection of the movement mode being the real time movement mode, the mobile platform is caused by the controller to move according to the movement information regarding the movement speed and the movement direction of the user such that the mobile platform keeps pace with the user.

3. The wearable robot according to claim 1, wherein, in response to detection of the movement mode being the following mode, the mobile platform is caused by the controller to move subsequent to a lapse of a predetermined standby time.

4. The wearable robot according to claim 1, wherein the movement mode of the mobile platform is automatically set to the movement mode in response to detection of wearing the upper limb muscular power assist device.

5. The wearable robot according to claim 1, wherein the movement mode of the mobile platform is automatically set to the following mode in response to detection of not wearing the upper limb muscular power assist device.

6. The wearable robot according to claim 1, wherein the input unit is further configured to perform interfacing with the movement of the user using a mode selection button.

7. The wearable robot according to claim 1, wherein the mobile platform is further configured to receive the information regarding the movement speed and the movement direction of the user through the sensor and the mobile platform is caused to move by the controller according to the received information.

8. The wearable robot according to claim 1, wherein the mobile platform comprises:
    driving wheels configured to adjust movement speed of the wearable robot; and
    front wheels configured to adjust movement direction of the wearable robot.

9. The wearable robot according to claim 1, wherein the upper limb muscular power assist device comprises a mobile platform connection unit, a shoulder series type mechanism unit, an elbow series type mechanism unit, a wrist parallel type mechanism unit, and a tool coupling unit.

10. The wearable robot according to claim 9, wherein the shoulder series type mechanism comprises:
    a ring unit connected to the mobile platform connection unit,
    a back articulation unit connected to the ring unit,
    a back muscle link unit connected to the back articulation unit, and
    a shoulder muscle link unit connected to the back muscle link unit.

11. The wearable robot according to claim 10, the shoulder series type mechanism further comprises:
    a shoulder front and rear articulation unit connected to the shoulder muscle link unit,
    a shoulder link unit connected to the shoulder front and rear articulation unit such that the shoulder link unit is rotated forward or backward by a predetermined angle according to motion of the shoulder front and rear articulation unit, and
    a shoulder left and right articulation unit connected to the shoulder link unit.

12. A control method of a wearable robot comprising an upper limb muscular power assist device to perform an articulation motion with a predetermined degree of freedom, the upper limb muscular power assist device being wearable by a user, and a mobile platform connected to the upper limb muscular power assist device to move according to information based on movement speed and movement direction of the user, the control method comprising:
    receiving information regarding movement direction and movement speed of the user through a movement sensor during movement of the user
    determining a movement mode based on the information associated with performance of the upper limb muscular power assist device and status of the upper limb muscular power assist device being worn or not being worn, and controlling movement type of the upper limb muscular power assist device according to the movement information, the movement mode comprising a real time movement mode and a following mode; and
    causing the mobile platform to move according to the determined movement mode and the received information detected by the sensor such that the mobile platform is selectively controlled to keep pace with movement of the user associated with performance of the upper limb muscular power assist device or to follow the user.

13. The control method according to claim 12, further comprising:
    controlling the mobile platform to move in real time according to the information regarding the movement direction and the movement speed of the user such that the mobile platform is caused to move by keeping pace with the user in in response to detection of the movement mode of the wearable robot being real time movement mode.

14. The control method according to claim 12, further comprising:
    controlling the mobile platform to follow the user after a lapse of a predetermined standby time in response to detection of a movement mode of the wearable robot is the following mode.

15. The control method according to claim 12, wherein the in the real time movement mode in response to detection of movement of the user while wearing the upper limb muscular power assist device.

16. The control method according to claim 12, wherein the mobile platform is controlled to move in the following mode such that the mobile platform follows the user after a lapse of a standby time in response to detection of movement of the user while not wearing the upper limb muscular power assist device.

17. A wearable robot comprising:
    a communication unit to receive information regarding movement direction and movement speed of a user during movement of the user; and
    a controller configured to determine a movement mode based on status of whether the wearable robot being worn or not being worn and to control movement type of the wearable robot according to the received information, the controller further configured
    to move a mobile platform without standby-time such that the wearable robot is performed by keeping pace with the user's movement associated with the wearable robot in response to detection of the wearable robot being worn or
    to move a mobile platform subsequent to standby-time to follow the user in response to detection of the wearable robot not being worn.

18. The wearable robot according to claim 17, wherein the controller is further configured to move the mobile platform according to a movement mode comprising a real time movement mode and a following mode, and the controller is configured to control the wearable robot to move such that the wearable robot keeps pace with the user in response to detection of the real time movement mode and to control the wearable robot to follow the user in a response to detection of the following mode.

* * * * *